No. 700,530. Patented May 20, 1902.
A. D. MILLER.
PROCESS OF TREATING ORES.
(Application filed Mar. 13, 1901.)
(No Model.)
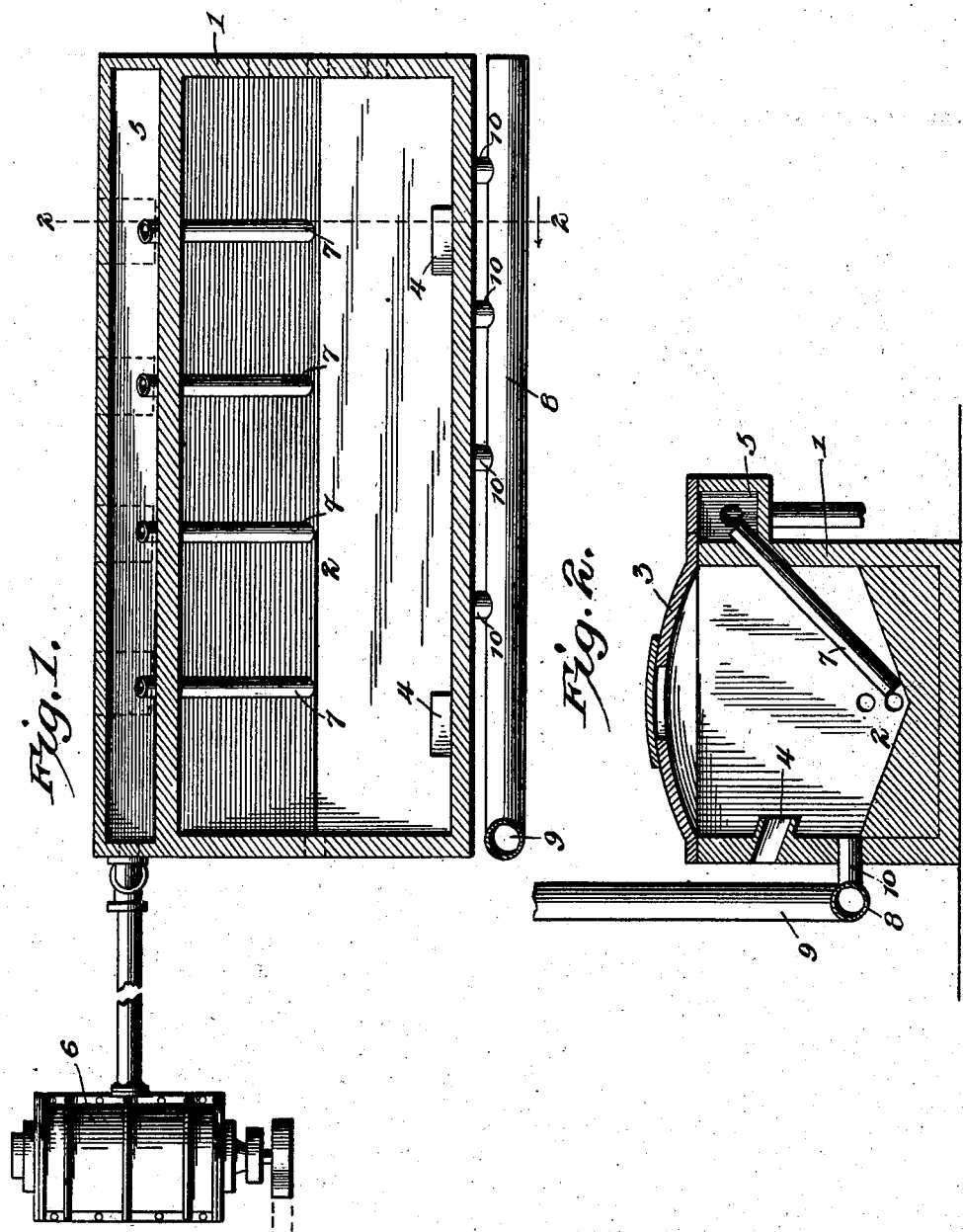

UNITED STATES PATENT OFFICE.

ANANIAS D. MILLER, OF MOUNT PLEASANT, PENNSYLVANIA.

PROCESS OF TREATING ORES.

SPECIFICATION forming part of Letters Patent No. 700,530, dated May 20, 1902.

Application filed March 13, 1901. Serial No. 51,000. (No specimens.)

*To all whom it may concern:*

Be it known that I, ANANIAS D. MILLER, a citizen of the United States, residing at Mount Pleasant, in the county of Westmoreland and State of Pennsylvania, have invented a new and useful Process for the Treatment of Ores, of which the following is a specification.

My present invention relates to a novel process for extracting metals from ores, or, in other words, for insuring the separation and concentration of the metal from the various substances with which it is associated in the ore or matte—for example, the ores of copper, lead, silver, gold, and other metals. In the development of the process it involves the employment of a flux and an oxidizer or oxygen-furnishing agent which furnishes the oxygen which combines with the various oxidizable impurities of the ores and removes them as oxides.

My process thus recited is based upon the discovery that asbestos when combined with a flux will quickly reduce ores to a liquid state at a comparatively low temperature and will effect a thorough separation of the metals, thus facilitating the melting and separation of ores which heretofore have been treated by methods involving considerable time and expense. These ores usually contain a number of different metals in various quantities, and ordinarily such metals cannot be separated except by the subjection of the ore to a series of different treatments, whereas the present invention comprehends a process which not only effects the ready fusion of the ores at a low temperature, but at the same time insures the separation of the silica and other impurities from the metals and causes an effective separation of the metals contained in the ore.

It is further contemplated to originate a process which will not only provide for the separation of the metals, silica, sulfur, and other substances, but will also provide for the separation of the metal from the matte itself, thus accomplishing the separation of the metal in one operation and effecting the concentration of the several metals in separate strata or layers above or below the other substances in the matte, according to the relative specific gravity of the various component substances of the ore. The combining of the flux with the asbestos in carrying out the process is for the purpose of facilitating the fusing of the ore and of the asbestos in order that the latter may more readily effect the separation of the metals and other substances, while the flux dissolves any metallic oxids which might form or tend to form during the melting of the ores.

In the accompanying drawings I have illustrated one form of apparatus which may be employed in practicing my process.

Figure 1 is a sectional plan view of a furnace equipped with a blower; and Fig. 2 is a transverse sectional view on the line 2 2 of Fig. 1, omitting the blower.

Referring to the numerals employed to designate the parts of the apparatus, 1 indicates the furnace, having a depressed bottom 2, a suitable top or cover 3, and charging-doors 4. Along one side of the furnace, near the top thereof, is provided an air-chamber 5 in communication with a suitable blower 6 and designed to constitute an air-reservoir for a series of blowing-tubes 7, by means of which a blast of air may be projected into the furnace during the practice of my process, to be described. At the side of the furnace opposite the air-chamber 5 is located a receiving-flue 8, provided with a stack 9 at one end and communicating with the interior of the furnace through a series of short tubes 10.

In carrying out the process the ore is taken as it comes from the mines and preferably is crushed and then mixed in any suitable manner with asbestos and is sprinkled with a flux—as, for instance, borax. The ore, thus intermixed with the fluxing agent and with the asbestos, which constitutes a separating agent, is then subjected to the action of heat in the furnace and preferably in the presence of oxygen produced by an oxygen-furnishing agent, which may be chemical or mechanical, or both. When the chemical oxygen-furnishing agent is used, I prefer to employ potassium permanganate, which may be sprinkled over the ore prior to or after its introduction to the furnace. The mechanical oxygen-furnishing agent is preferably in the form of a blast-producing device, as shown in the drawings, for injecting the oxygen into the furnace during the fusing of the substances being treated, and it is evident that in order to secure the greatest activity of the fluxing and separating agents both forms of oxygen-furnishing agents may be employed, with the result that the oxidizable substances will be more quickly released as oxides, while the gangue and other less oxidizable impurities are fluxed off by the asbestos and borax to permit the separation of the metals.

It will be evident that the order in which the enumerated steps are practiced is not essential—that is to say, the separating and fluxing agents—to wit, the asbestos and borax—may be mixed with the ore during the crushing of the latter or afterward, or they may be introduced separately or together or before or during the subjection of the ore to heat within the furnace. The only essential peculiarity of the process, so far as the order or sequence of its steps is concerned, is that the ore must be subjected simultaneously at some time during the carrying out of the process to the action of heat and to the action of the fluxing and separating agents.

For the purpose of making clear the reaction resulting from the combination of chemicals employed a few of the typical reactions which I believe to occur appear in the carrying out of the process may be stated as follows:

*Types for Sulfids and Sulfur Compounds.*

Chacocite:
$$Cu_2S + {}_2O = 2Cu + SO_2.$$
Covellite:
$$CuS + {}_2O = Cu + SO_2.$$
Chalcopyrite and type for copper matte:
$$CuFeS_2 + {}_4O = Cu + Fe + {}_2SO_2.$$
Erubescite:
$$Cu_3FeS_3 + {}_6O = 3Cu + Fe + 3SO_2.$$
Galena:
$$PbS + {}_2O = Pb + SO_2.$$
Argentite:
$$Ag_2S + {}_2O = 2Ag + SO_2, \&c.$$

*Types for Arsenides.*

Whitneyite:
$$Cu_{18}As_2 + {}_3O = 18Cu + As_2O_3.$$
Mispickle:
$${}_2Fe_2AsS_2 + {}_{11}O = 4Fe + As_2O_3 + {}_4SO_2, \&c.$$

Similar reactions take place in connection with antimony, tellurium, and other compounds of the metals, either natural or artificial.

I make no claim in this application to the fluxing and separating compound having the several ingredients referred to as being essential to the carrying out of my process, said compound being described and claimed in my concurrent application for Letters Patent, filed March 13, 1901, Serial No. 50,999.

Having thus described my invention, what I claim as new, and desire to secure by Letters Patent, is—

1. That process for the treatment of ores which consists in mixing the ore with asbestos and a flux and in subjecting the ore thus treated to the action of heat.

2. That process for the treatment of ores which consists in mixing the ore with asbestos and a flux and in subjecting the ore thus treated to the action of an oxygen-furnishing agent and heat.

3. That process for the treatment of ores which consists in mixing the ore with asbestos and a flux, and in subjecting the ore thus treated to the action of heat in the presence of oxygen furnished both mechanically and by chemical reaction.

4. That process for the treatment of ores which consists in mixing the ore with asbestos, a flux and permanganate of potash, and in subjecting the ore thus treated to the action of heat.

In testimony that I claim the foregoing as my own I have hereto affixed my signature in the presence of two witnesses.

ANANIAS D. MILLER.

Witnesses:
H. M. CORWIN,
E. J. KENT.